United States Patent
McKenzie

(10) Patent No.: US 6,573,827 B1
(45) Date of Patent: Jun. 3, 2003

(54) SYSTEM AND METHOD OF DETECTING VEHICLE SPEED LIMITING SYSTEM TAMPERING

(75) Inventor: Ian D. McKenzie, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 13 days.

(21) Appl. No.: 09/712,477

(22) Filed: Nov. 14, 2000

(51) Int. Cl.⁷ .............................................. B60Q 1/00
(52) U.S. Cl. .................. 340/438; 340/988; 342/357.07; 701/93; 701/207; 701/213
(58) Field of Search .................. 340/438, 500, 340/988; 701/93, 207, 208, 213; 342/357.06, 351.07, 357.08

(56) References Cited

U.S. PATENT DOCUMENTS

| | | |
|---|---|---|
| 4,493,303 A | 1/1985 | Thompson et al. |
| 5,343,780 A | 9/1994 | McDaniel et al. |
| 5,359,528 A | 10/1994 | Haendel et al. |
| 5,375,059 A | 12/1994 | Kyrtsos et al. |
| 5,438,517 A | 8/1995 | Sennott et al. |
| 5,612,875 A | 3/1997 | Haendel et al. |
| 5,646,843 A | 7/1997 | Gudat et al. |
| 5,657,232 A | 8/1997 | Ishikawa et al. |
| 5,706,199 A * | 1/1998 | Wilson et al. ............... 702/150 |
| 5,742,914 A | 4/1998 | Hagenbuch |
| 5,796,178 A | 8/1998 | Onuma |
| 5,828,585 A | 10/1998 | Welk et al. |
| 5,828,987 A * | 10/1998 | Tano et al. .................. 702/150 |
| 5,878,361 A | 3/1999 | Sekine et al. |
| 5,878,362 A | 3/1999 | Sekine et al. |
| 5,896,083 A * | 4/1999 | Weisman, II et al. ....... 340/438 |
| 5,956,250 A | 9/1999 | Gudat et al. |
| 5,983,156 A | 11/1999 | Andrews |
| 5,995,895 A | 11/1999 | Watt et al. |
| 6,249,217 B1 * | 6/2001 | Forbes ........................ 340/426 |
| 6,411,887 B1 * | 6/2002 | Martens et al. ............. 701/115 |

* cited by examiner

*Primary Examiner*—Julie Lieu
(74) *Attorney, Agent, or Firm*—Brooks & Kushman P.C.

(57) ABSTRACT

A method and system for detecting tampering with a vehicle speed sensor by calculating an average speed based upon global positioning system data. A first position of a vehicle is learned from a global positioning system at a first time. After a time interval the system learns a second position from the GPS at a second time. Based on this information, the average speed is calculated and is then compared to a maximum speed limit value. The system checks to determine if anyone has tampered with the GPS if no over speed condition is detected. If an over speed condition is detected or if there is an indication of tampering with the global positioning system, the system integrates a vehicle speed sensor tampering system that is either logged in memory or may be used to limit engine speed by controlling the engine control module.

8 Claims, 1 Drawing Sheet

SYSTEM AND METHOD OF DETECTING VEHICLE SPEED LIMITING SYSTEM TAMPERING

TECHNICAL FIELD

The present invention relates to a method and a system of detecting vehicle speed limiting system tampering utilizing global positioning system data commercial vehicles including trucks and buses may be part of a fleet of vehicles that are owned and operated by a fleet owner.

BACKGROUND ART

Fleet owners faced with increasing fuel costs and drivers who exceed speed limits need a simple and reliable system for limiting vehicle speed that cannot be easily defeated by drivers or mechanics. Mechanical or electronic speed governors have been developed to automatically limit a vehicle's operating speed. Governors and other speed limiting devices may be defeated or disconnected by a driver. When this occurs fleet owners suffer losses as a result of excessive fuel costs and lose the ability to control the operation of trucks by limiting their speed.

One example of a speed limiting system used to detect tampering with a vehicle speed sensor is disclosed in U.S. Pat. No. 5,896,083 and is assigned to the assignee of this application. The '083 patent compares a gear ratio set to a reference gear ratio to determine a gear ratio difference value. An error signal is generated to indicate tampering with the vehicle speed sensor when the gear ratio difference value exceeds a threshold value. While this approach has proven to be generally effective, a more flexible and universal approach is needed to determine if there has been any tampering with a vehicle speed limiting system.

Global positioning systems have been developed to aid in navigation. Global positioning systems utilize a plurality of satellite signals that are integrated to provide an accurate indication of the position of the global positioning system receiver. Global positioning systems usually provide information that is either provided as a digital readout or is used to display the location in conjunction with a map display.

The use of a global positioning system to calibrate a vehicle's speed sensor is disclosed in U.S. Pat. No. 5,828,585. This patent claims a system and method of automatically calibrating a vehicle speed sensor signal to provide an accurate speed signal for use in vehicle navigation systems. This patent fails to disclose the use of a global positioning system in a method or a system for detecting tampering with a vehicle speed limiting system.

These and other problems and limitations inherent in prior art methods and systems are addressed by applicant's invention as summarized below.

DISCLOSURE OF INVENTION

According to the present invention, an engine control module (ECM) obtains vehicle position data from a global positioning system (GPS) at spaced time intervals and calculates the average road speed over the time interval. The average road speed is then compared to a value for the allowed vehicle road speed. If the average road speed is in excess of the allowable road speed, tampering with the vehicle speed sensor is signaled. Once tampering is detected the ECM may log the signal memory, reduce the allowable road speed of the vehicle or reduce the allowable engine RPM. The system also determines whether the GPS was tampered with, for example by disconnecting its wires and may either note the tampering or limit road speed or engine RPM in response to the tampering detected.

According to the present invention a method of detecting vehicle speed sensor tampering for a vehicle having a global positioning system (GPS), a clock, and an engine control module (ECM). The method comprises storing a first position signal from the GPS and storing a first time value substantially simultaneously while storing the first position signal. After a period of time, a second position signal from the GPS is stored substantially simultaneously with a second time value. The term substantially simultaneous as used herein means that the GPS system position reading and time value are coordinated to permit an accurate average speed value based upon the readings. The average vehicle speed is then calculated over the period of time and is compared to a stored value of a maximum vehicle speed. A vehicle speed limiting system tampering signal is then generated if the average vehicle speed is greater than the maximum vehicle speed. The ECM is controlled in response to the vehicle speed limiting system tampering signal.

The ECM may be controlled by changing or limiting the allowed engine revolutions per minute or by changing or limiting the allowed vehicle road speed. The ECM may also be controlled to record data in a data recorder to provide a record that vehicle speed limiting system tampering signal was generated by the system.

If the average vehicle speed is not greater than the maximum vehicle speed and this method may include the step of checking the operation of the GPS to determine if the GPS was tampered with or disabled. If so, the system would generate a vehicle speed limiting system tampering signal.

The present invention also relates to a system for detecting vehicle speed sensor tampering. The system includes an engine control module, a global positioning receiver operatively connected to the engine control module and a clock operatively connected to the engine control module. The engine control module learns a first position from the global positioning receiver and first time from the clock. The system waits a predetermined period of time and the engine control module learns a second position from the global positioning receiver and a second time from the clock. The engine control module calculates the average vehicle speed that is compared to a predetermined value corresponding to a speed limit value stored in the engine control module. If the average vehicle speed is greater than the speed limit value, a signal is generated to cause the engine control module to limit the engine speed in response to the signal being generated.

According to the system, the engine speed may be limited by limiting the allowed number of engine revolutions per minute, limiting the allowed vehicle road speed or by making a record in a data recorder.

The system also checks the operation of the global positioning system to determine if the global positioning system was tampered with or disabled whereupon the system may generate a signal indicating that there has been tampering with the global positioning system.

The above objects and advantages and other features of the invention are better understood in view of the attached drawing and following detailed description of the method and system of the present invention.

BEST MODE FOR CARRYING OUT THE INVENTION

Figure 1:
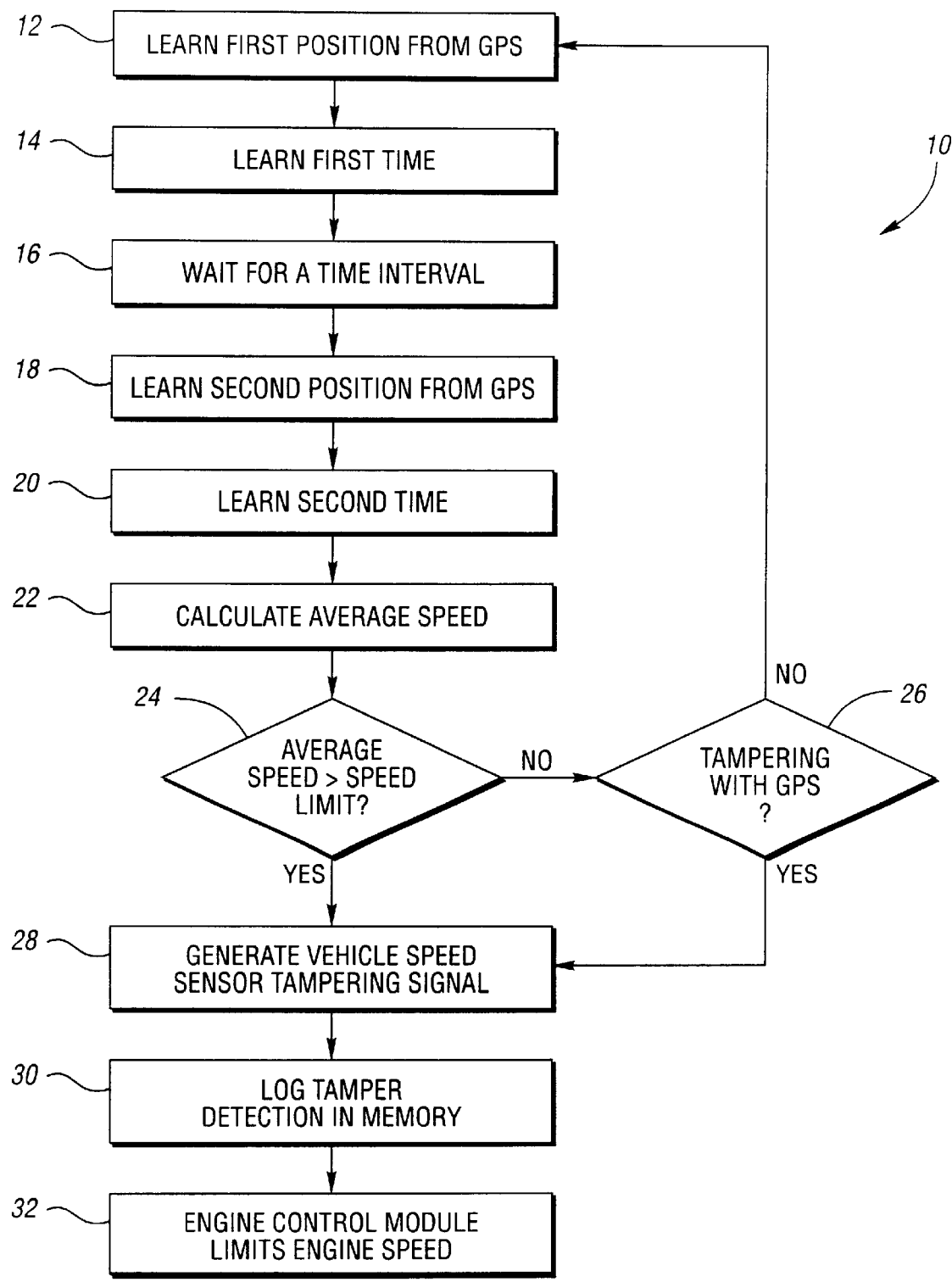
FIG. 1 is a flowchart illustrating the steps of the method and elements of the system of the present invention.

Referring now to FIG. 1, a method and system for detecting vehicle speed sensor tampering generally indicated by reference numeral 10 is illustrated. According to the method the system 10 first learns the position of a vehicle from a global positioning system at 12. At substantially the same time that the system 10 is learning the first position from the GPS a first time is learned at 14. The system 10 then waits for a predetermined time interval at 16. A second position is learned from the GPS at 18 and substantially simultaneously therewith a second time is learned at 20. The average speed is calculated at 22 by determining the distance between the first and second positions and dividing by the difference between the first and second learned times. The average speed is calculated at 22. The average speed is then compared to a predetermined speed limit value or maximum vehicle speed value at 24. If the average speed is not greater than the speed limit, the system is checked to determine if there has been tampering with the GPS at 26. If there has been no tampering with the GPS, the system returns to the beginning at block 12 to provide a continuously monitored system. If the average speed is greater than the speed limit at 24 or if tampering is detected with the GPS at 26, the system generates a vehicle speed sensor tampering signal at 28. The vehicle speed sensor tampering signal may be logged as a tamper detection event in memory at 30 or the vehicle speed senor tampering signal may be received by the engine control module to limit the engines speed at 32.

The engine control module may act upon receipt of the vehicle speed sensor tampering signal by reducing the allowable road speed of the vehicle or reducing the allowable engine RPM of the engine.

The limitation on the road speed or engine RPM can be effective for a period of time or could continue to be imposed until cleared by entry of an authorized password protected command controlled by the fleet owner.

The ECM may learn and store the current vehicle position internal to the engine control module. Alternatively, the current vehicle position could be learned by the vehicle controller. The current vehicle position could also be learned and stored in a separate control module communicating over the SAE J1708, SAE J1939 or other data link with the engine control module. The global positioning system can be engine mounted, mounted in the engine compartment or mounted elsewhere in the vehicle at a location remote from the engine compartment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of detecting vehicle speed sensor tampering for a vehicle having a global positioning system (GPS), a clock and an engine control module (ECM), comprising:

storing a first position signal from the GPS;

storing a first time value substantially simultaneously with storing the first position signal;

waiting a period of time;

storing a second position signal from the GPS;

storing a second time value substantially simultaneously with storing the second position signal;

calculating the average vehicle speed over the period of time;

comparing the average vehicle speed to a stored value of a maximum vehicle speed;

generating a vehicle speed limiting system tampering signal if the average vehicle speed is greater than the maximum vehicle speed;

checking the operation of the GPS if the average vehicle speed is not greater than the maximum vehicle speed to determine if the GPS was tampered with or disabled and generating the vehicle speed limiting system tampering signal wherein the average vehicle speed is determined to be less than the maximum speed if the first position signal and the second position signal correspond with the same position or if the first position signal and the second position signal are not received from the GPS; and controlling the ECM in response to the vehicle speed limiting system tampering signal.

2. The method of claim 1 wherein the step of controlling the ECM comprises changing the allowed engine revolutions per minute.

3. The method of claim 1 wherein the step of controlling the ECM comprises changing the allowed vehicle road speed.

4. The method of claim 1 wherein the step of controlling the ECM comprises recording in a data recorder that the vehicle speed limiting system tampering signal was generated.

5. A system for detecting vehicle speed sensor tampering in a vehicle, comprising:

an engine control module;

a global positioning receiver operatively connected to the engine control module;

a clock operatively connected to the engine control module;

the engine control module learning a first position from the global positioning receiver;

the engine control module learning a first time from the clock;

waiting a period of time;

the engine control module learning a second position from the global positioning receiver;

the engine control module learning a second time from the clock;

the engine control module calculating the average vehicle speed;

the engine control module comparing the average vehicle speed to a predetermined value corresponding to a speed limit value stored in the engine control module and generating a tampering signal if the average vehicle speed is greater than the speed limit value;

the engine control module checks the operation of the global positioning system if the average vehicle speed is not greater than the maximum vehicle speed to determine if the global positioning system was tampered with or disabled and generating the tampering signal wherein the average vehicle speed is determined to be less than the maximum speed if the first position signal and the second position signal correspond with the same position or if the first position signal and the second position signal are not received from the GPS; and the engine control module limiting engine speed in response to the tampering signal being generated.

6. The system of claim 5 wherein the engine control module limits the engine speed by limiting the allowed number of engine revolutions per minute.

7. The system of claim 5 wherein the engine control module limits the engine speed by limiting the allowed vehicle road speed.

8. The system of claim 5 wherein engine control module records in a data recorder that the signal was generated indicating that the average vehicle speed was greater than the speed limit value.

* * * * *